(12) United States Patent
Stohr et al.

(10) Patent No.: US 8,010,638 B2
(45) Date of Patent: Aug. 30, 2011

(54) METHOD AND APPARATUS FOR UPDATING FIRMWARE FOR INTERFACE UNIT CONNECTING PORTABLE AUDIO/VIDEO PLAYER WITH ANOTHER AUDIO/VIDEO PLAYER

(75) Inventors: Luis Stohr, Torrance, CA (US); Ben Khau, Torrance, CA (US); Satoshi Tanimoto, Redondo Beach, CA (US); Anh Ly, Anaheim, CA (US)

(73) Assignee: Alpine Electronics, Inc., Tokyo (JP)

( * ) Notice: Subject to any disclaimer, the term of this patent is extended or adjusted under 35 U.S.C. 154(b) by 385 days.

(21) Appl. No.: 11/906,837

(22) Filed: Oct. 4, 2007

(65) Prior Publication Data
US 2008/0250126 A1 Oct. 9, 2008

Related U.S. Application Data

(60) Provisional application No. 60/922,157, filed on Apr. 5, 2007.

(51) Int. Cl.
*G06F 15/177* (2006.01)
*G06F 17/00* (2006.01)
*H04B 1/00* (2006.01)
(52) U.S. Cl. .............................. 709/221; 381/86; 700/94
(58) Field of Classification Search .......... 709/220–222; 381/86; 701/24–36, 207–211; 700/94
See application file for complete search history.

(56) References Cited

U.S. PATENT DOCUMENTS

| 6,849,794 | B1 | 2/2005 | Lau et al. | |
| 6,990,208 | B1 * | 1/2006 | Lau et al. | 381/86 |
| 7,146,274 | B2 * | 12/2006 | Linkohr | 701/208 |
| 7,200,357 | B2 * | 4/2007 | Janik et al. | 455/3.02 |
| 7,590,486 | B2 * | 9/2009 | Okude et al. | 701/208 |
| 7,913,247 | B2 * | 3/2011 | Diederichs | 717/173 |
| 2005/0080846 | A1 | 4/2005 | McCleskey et al. | |
| 2006/0161344 | A1 * | 7/2006 | Iwahori et al. | 701/211 |
| 2007/0009108 | A1 * | 1/2007 | Furge | 381/86 |
| 2007/0212026 | A1 * | 9/2007 | Herpel et al. | 386/95 |

* cited by examiner

*Primary Examiner* — Ario Etienne
*Assistant Examiner* — Gregory G Todd
(74) *Attorney, Agent, or Firm* — Muramatsu & Associates

(57) ABSTRACT

A method and apparatus updates software data for an interface unit that interfaces a portable audio/video player with another audio/video system. When the portable audio/video players are updated by adding new features, etc., the method and apparatus enables the users to obtain the corresponding update file for the interface unit in the same manner that the user obtains the music file. Thus, the user can easily and quickly obtain the update file for updating the interface unit and store it in the portable audio/video player in the same manner as the music files. For executing the update operation, the user selects the update file from the play list and starts playing the update file on the portable audio/video player while connecting it to the interface unit.

20 Claims, 12 Drawing Sheets

Fig. 10A
:10081000E0CF07F0001E9CF0DF0EAFC08F0E1CF1B10028
:10081000C9CF07E0001E9CF0DF0EAFC08F0E1CE1B00D1
:10081000F01607F00F01E9CF0DF0EAC08F42FC1B1D10F2
Fig. 10B
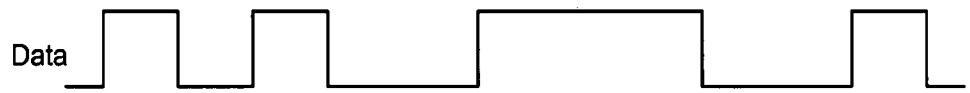
Fig. 10C
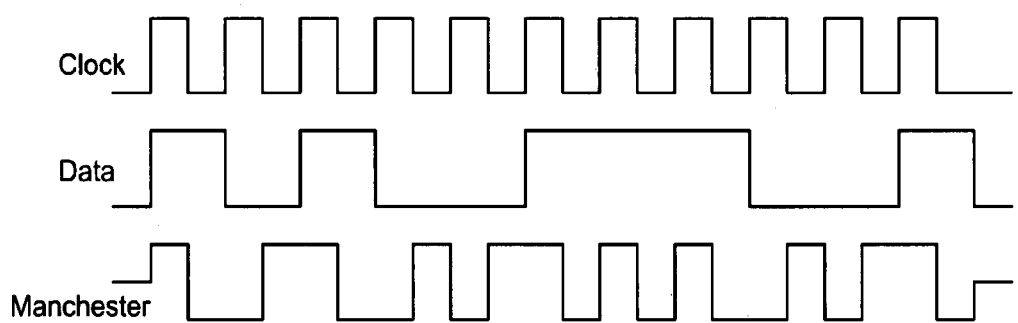

METHOD AND APPARATUS FOR UPDATING FIRMWARE FOR INTERFACE UNIT CONNECTING PORTABLE AUDIO/VIDEO PLAYER WITH ANOTHER AUDIO/VIDEO PLAYER

This application claims the benefit of U.S. Provisional Application No. 60/922,157 filed Apr. 5, 2007, which is herein incorporated by reference.

FIELD OF THE INVENTION

This invention relates generally to a method and apparatus for updating firmware for a portable music player, and more particularly, to a method and apparatus for updating software data for an interface unit that interfaces a portable audio/video player with another audio/video system easily, quickly at low cost when the portable audio/video player is updated by playing the update file by the portable audio/video player.

BACKGROUND OF THE INVENTION

Portable audio/video players such as iPod, Zoon, and Gigabeet are popular devices to listen to music as well as to watch visual images. Typically, these device store music and video files (hereafter "music file") in such file formats as MP3, WAV, WMA, AAC, etc., which can be easily downloaded through wired or wireless network communication. A user creates a library of favorite music files in the portable audio/video player and listens to the music while working, studying, walking, or the like.

FIG. 1 is a schematic diagram showing a basic structure involved in a portable audio/video player for downloading and creating a library of music files in the portable audio/video player. Typically, before using a portable audio/video player 51, a user 47 generally operates a computer 49 to transfer audio data from a remote service provider (WEB) 21 to the portable audio/video player 51. The computer 49 installs an application software such as "i-Tune" to assist such operations thereby creating a play list (library) in the portable audio/video player 51. In operation, the user wares a headset, and starts the portable audio/video player 51 to enjoy the favorite music or moving images selected from the play list.

Due to the usefulness of these devices, many users want to use the portable audio/video players to listen to their favorite music stored therein through another audio/video players such as a one having a larger screen and speakers. For example, a user wants to enjoy the music stored in the portable audio/video player in a vehicle with use of the vehicle's audio/video system without using a headset of the portable audio/video player. Many recent vehicles equip vehicle audio/video players (head units) which allow the users to enjoy music and videos in the vehicles with high quality sounds and display. Such a vehicle audio/video player (vehicle entertainment system) has a screen and speakers much larger and powerful than that of the portable audio/video player.

Thus, there is a desire to use such a portable audio/video player in combination with another player such as a vehicle audio/video player so that a user can enjoy his/her preferred music or dramas, etc., stored in the portable audio/video player when the user is driving a vehicle. In order to connect the portable audio/video player to the vehicle audio/video system, an interface unit is used as shown in the schematic diagram of FIG. 2. In this example, an interface unit 55 is connected between the portable audio/video player 51 and the vehicle audio/video player 60 to establish communication between the two by compensating the differences in data formats, etc.

Typically, a supplier of such portable audio/video players 51 and a supplier of such interface units 55 are different entities. Portable audio/video players 51 such as i-Pod are updated relatively frequently for improving the functionalities, adding new features, correcting the problems, etc. Typically, a supplier of portable audio/video players 51 (ex. Apple Computer, Inc. that supplies i-Pod) announces such updates so that the users can obtain the firmware versions of the updates through network communication such as through Internet.

Then, in the application of FIG. 2 in which the portable audio/video player 51 is connected to the vehicle audio/video player 60 through the interface unit 55, it is also necessary to update the interface unit 55 every time when the portable audio/video unit 51 is updated. This is because the interface unit 55 needs to include the information, signals, etc., involved in the update of the portable audio/video unit 51 so that the vehicle audio/video player 60 and the portable audio/video unit 51 can communicate with one another. Therefore, when the supplier of the interface unit 55 knows the release of the update of the portable audio/video unit 51, it has to provide means or service to the user to update the software of the interface unit 55 as well.

However, at present, there has been no easy way to update the interface unit 55 corresponding to the update of the portable audio/video player 51. It is inconvenient and costly if the user has to visit a vehicle dealer or a vendor of such an interface unit 55 to have the interface unit 55 updated. Further, users of such portable audio/video players 51 are usually not sophisticated to install by themselves a new software for the update on the interface unit 55. Thus, there is a need of a new method and apparatus that enables a user to update the software of the interface unit for the portable audio/video player easily and quickly, at any desired time, with low cost.

SUMMARY OF THE INVENTION

It is, therefore, an object of the present invention to provide a method and apparatus for updating software data for an interface unit that interfaces a portable audio/video player with another audio/video system easily and quickly, at any desired time, with low cost.

It is another object of the present invention to provide a method and apparatus for updating software data for an interface unit that interfaces a portable audio/video player with another audio/video system by starting the update file to play on the portable audio/video player.

It is a further object of the present invention to provide a method and apparatus for updating software data for an interface unit that interfaces a portable audio/video player with another audio/video system in a manner similar to an ordinary use of the portable audio/video player for downloading and playing the music file.

One aspect of the present invention is a method of updating an interface unit which interfaces between a portable audio/video player and another audio/video player. The method includes the steps of: creating an update file for updating the interface unit when an operation of the portable audio/video player is updated, said update file being designed to implement the update of the portable audio/video player on the another audio/video player; storing the update file in the portable audio/video player through a process identical to that storing a music file in the portable audio/video player for reproducing audio sounds and/or video images; connecting the portable audio/video player with the interface unit; and running the update file on the portable audio/video player so that the update file is transferred to the interface unit. The update file stored in the portable audio/video player is in a format identical to that of the music file for the portable audio/video player.

In the method of the present invention, the step of creating the update file for updating the interface unit includes a step of developing software data for the interface unit that realizes, in the another audio/video player, improvements, new function, or correction of problem identical to that achieved by the update of the portable audio/video player.

Further, the step of creating the update file for updating the interface unit includes a step of converting the software data for the interface unit to a format identical to that used in the music file used in the portable audio/video player. Further, the step of creating the update file for updating the interface unit includes a step of placing the update file in a market so that the update file is available to a user through a method and channel identical to that the user obtains music files for the portable audio/video player.

In the method of the present invention, the step of storing the update file in the portable audio/video player includes a step of connecting the portable audio/video player with a computer and assigning the update file in a play list of the portable audio/video player through an application software installed on the computer.

In the method of the present invention, the step of connecting the portable audio/video player with the interface unit includes a step of further connecting the interface unit to the another audio/video player so that information identical to that shown on the portable audio/video player is also shown on the another audio/video player and an instruction from the another audio/video player can be sent to the portable audio/video player. The step of connecting the portable audio/video player with the interface unit further includes a step of selecting the update file on a screen of the another audio/video player which is sent to the portable audio/video player.

In the method of the present invention, the step of creating the update file for the interface unit includes a step of encoding the software data so that the update file has the format identical to that of the music file used for the portable audio/video player. Further, in the present invention, the step of running the update file includes a step of decoding the update file by the interface unit to retrieve the software data as a digital signal so that the software data is written in a memory of the interface unit thereby updating the interface unit.

Another aspect of the present invention is an apparatus for updating an interface unit which interfaces between a portable audio/video player and another audio/video player. The apparatus of the present invention is configured by components corresponding to the various steps defined in the method invention noted above.

According to the present invention, when the portable audio/video players are updated by improving the functionalities, adding new features, correcting the problems, etc., the method and apparatus of the present invention enables the users to obtain the corresponding update file for the interface unit in the same manner that the user obtains the music file. Thus, the user can easily and quickly obtain the update file for updating the interface unit and store it in the portable audio/video player in the same manner as the music files. When executing the update operation, the user selects the update file from the play list and starts playing the update file on the portable audio/video player while connecting it to the interface unit.

In other words, the user can treat the update file for the interface unit in the same way as the music file so that when the user starts the update file on the portable audio/video player, the update operation for the interface unit will be executed. Namely, the method and apparatus of the present invention updates the software data for the interface unit by starting the update file to play on the portable audio/video player in the same manner as an ordinary use of the portable audio/video player for downloading and playing the music file. Therefore, the method and apparatus of the present invention enables to update the software data for the interface unit easily and quickly, at any desired time, with low cost.

BRIEF DESCRIPTION OF THE DRAWINGS

FIG. 4A shows a situation to select the update file and FIG. 4B shows a situation to start playing the update file.

FIGS. 10A-10C are timing chart showing an example of waveform conversion of the software data for creating the update file in the present invention, where FIG. 10A shows HEX representation of the software data for updates, FIG. 10B shows a data waveform corresponding to the software data of FIG. 10A, and FIG. 10C shows waveforms for converting the data of FIG. 10B to Manchester encoded data to create the update file in the music file format.

FIG. 11A shows a block diagram thereof including a decoder, FIG. 11B shows waveforms associated with the decoder for decoding the update file, and FIG. 11C shows an example of circuit structure of ADC as an example of the decoder.

DETAILED DESCRIPTION OF THE PREFERRED EMBODIMENT

The present invention will be described in detail with reference to the accompanying drawings. The method and apparatus of the present invention is designed to easily update software data for an interface unit that interfaces between a portable audio/video player and an external system, such as a vehicle audio/video player. The interface unit allows the user to enjoy the music, etc. stored in the portable audio/video player through the vehicle audio/video system having a monitor screen and speakers which are much larger and higher quality than that of the portable audio/video player.

As noted above, portable audio/video players such as iPod, Zoon, and Gigabeet are updated relatively frequently for improving the functionalities, adding new features, correcting the problems, etc. Typically, suppliers of portable audio/video players announce such updates so that the users can obtain the firmware versions of the updates through network communication such as Internet. Then, in the present invention, a supplier of the interface unit produces a corresponding update file for the interface unit and makes it available in a manner similar to that the user obtains a music file such as downloads and stores the music file in the portable audio/video player.

In other words, the user can treat the update file for the interface unit in the same way as the music file so that when the user starts the update file on the portable audio/video player, the update operation for the interface unit will be executed. It should be noted that although the present invention is described with respect to the case where an interface unit is implemented for interfacing with a vehicle audio/video system, the present invention is not limited to such a specific application. For example, the present invention can be implemented for connecting a portable audio/video player with a home audio/video system, home theater, etc.

Figure 3:
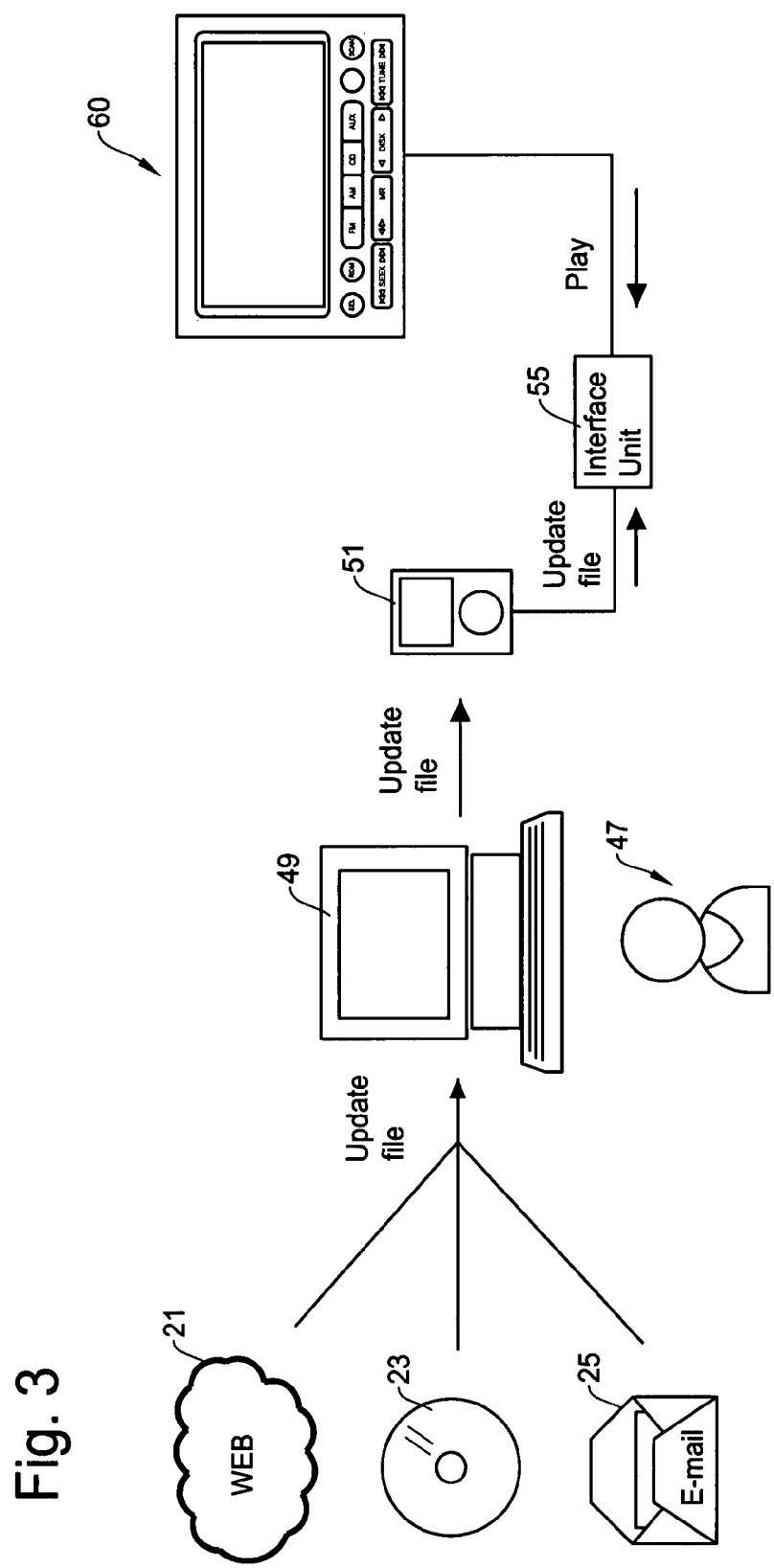
FIG. 3 is schematic diagram showing an overall structure for implementing the present invention for downloading the update file, connecting the portable audio/video player with the vehicle audio/video player through the interface unit, and running the update file for updating the interface unit.

FIG. 3 is schematic diagram showing an overall structure for implementing the present invention for downloading the update file, connecting the portable audio/video player with the vehicle audio/video player through the interface unit, and running the update file for updating the interface unit. The supplier of portable audio/video players announces an update so that the users can obtain the firmware versions of the update at a shop, directly from the supplier, or through network communication such as through Internet. Then, the supplier of the interface unit develops software for updating the interface unit in the market to accommodate the update of the portable audio/video player.

The supplier of the interface unit converts the software to an audio format to create an update file which is in the same format as that of the music file. Such a conversion process is done through a simple encoding method such as Manchester encoding or other methods. In the example of FIG. 3, the supplier of the interface unit supplies the update file to the user through various sources such as through Web (Internet) 21, storage media (CD, memory card, etc.) 23, or electric mail (E-mail) 25 in the same manner that the music files for the portable audio/video player are supplied to the users.

Thus, the user 47 downloads or otherwise inputs the update file to the application software such as "i-Tunes" in the computer 49 in the same manner that the user downloads the music file. Upon classification and assignment in a play list requested by the user, the computer 49 transfers the update file to the portable audio/video player 51. As shown in FIG. 3, in the same manner as playing the music through the vehicle audio/video player 60, the user connects the portable audio/video player 51 to the vehicle audio/video player 60 via the interface unit 55.

The interface unit 55 provides functionalities for, among others, transmitting the music file from the portable audio/video player 51 to the vehicle audio/video player 60 for listening the music, displaying the play list on the screen of the vehicle audio/video player 60, sending command signals from the vehicle audio/video player 60 to the portable audio/video player 51 to select and start the music file, etc. Although the interface unit 55 is connected to the vehicle audio/video player 60 through a cable, the two can also communicate wirelessly through, for example, FM transmission. The vehicle audio/video player 60 may also function as a vehicle navigation system for guiding a user to a selected destination when it is combined with a global positioning system (GPS).

Figure 4A:
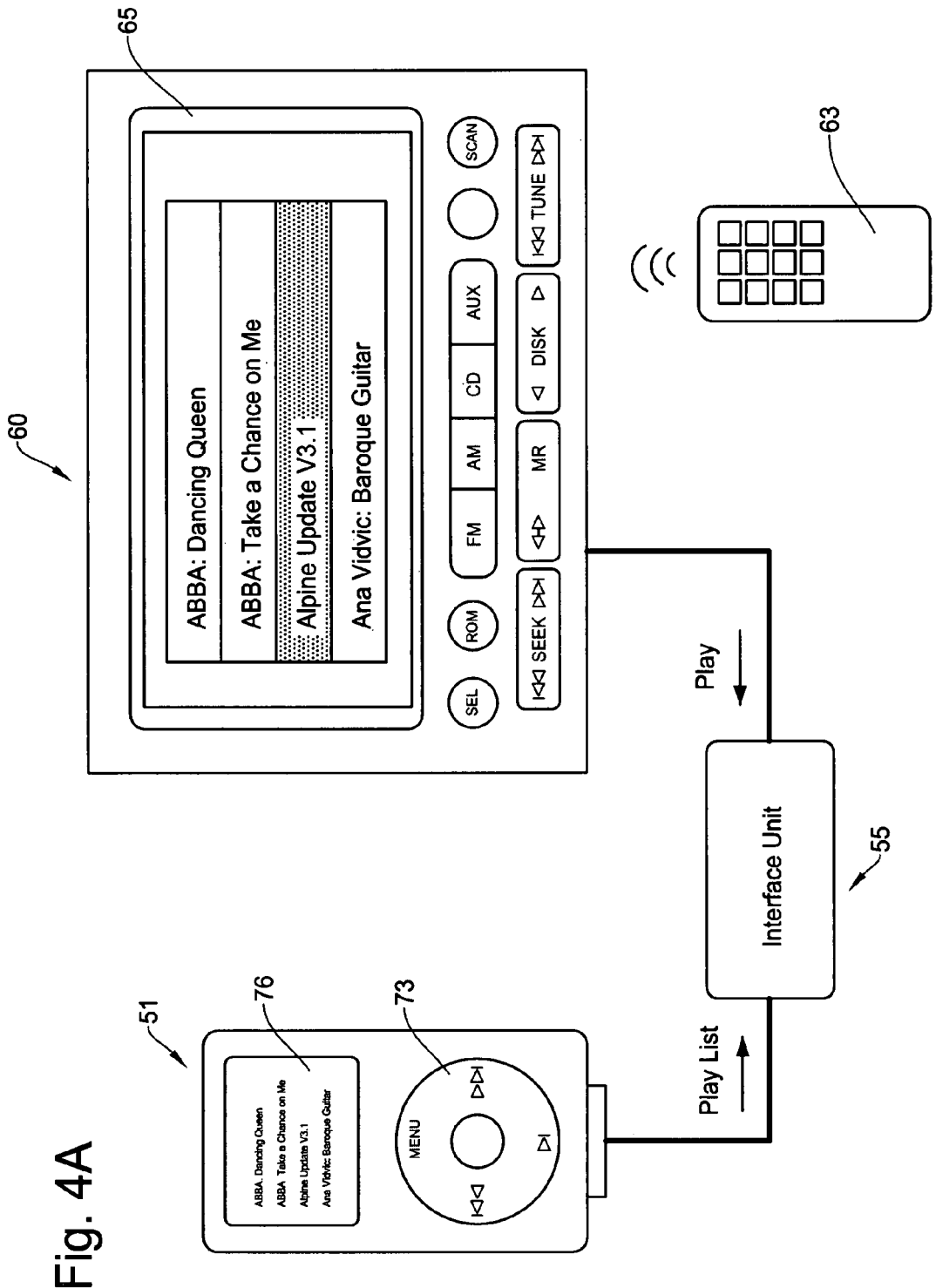
FIGS. 4A and 4B are schematic diagrams showing a basic structure for implementing the present invention for updating the interface unit while connecting the portable audio/video player with the vehicle audio/video player through the interface unit, where
Figure 4B:
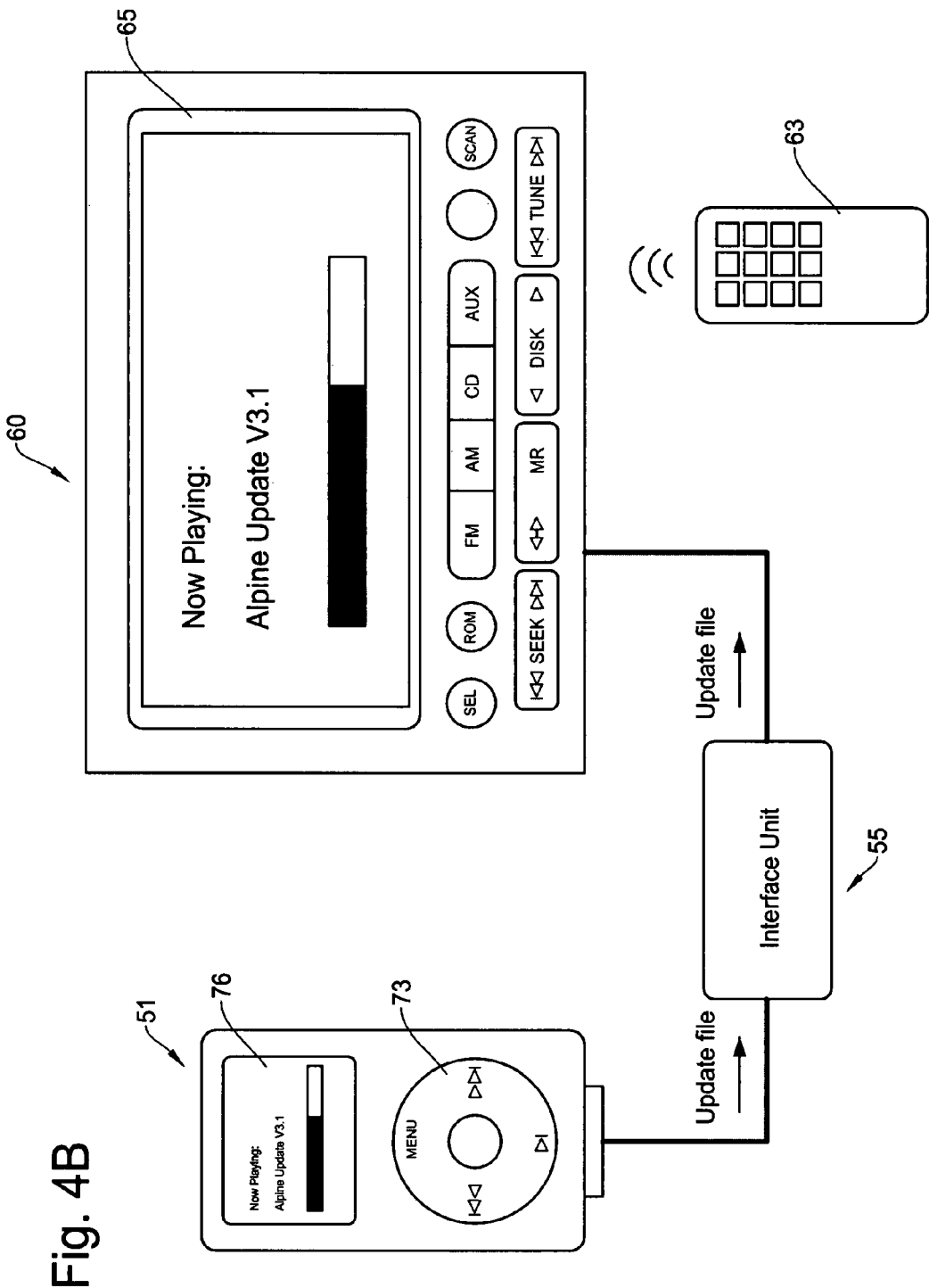

FIGS. 4A and 4B are schematic diagrams showing situations under the present invention to execute the update for the interface unit in the present invention. FIG. 4A shows a situation where the user selects the update file on the screen of the vehicle audio/video player 60 and instructs the portable audio/video player 51 to play the update file. FIG. 4B shows a situation where the portable audio/video player 51 plays the update file in the same manner that it plays the selected music, thereby updating the interface unit 55.

As shown in FIGS. 4A and 4B, the portable audio/video player 51 includes a screen 76 and a controller 73 and the vehicle audio/video player 60 includes a screen 65 and various control keys. Because of the interface unit 55 which transfers the play list, the vehicle audio/video player 60 displays the play list identical to that shown on the screen 76 of the portable audio/video player 51. The user selects the update file "Alpine Update V3.1" which is now highlighted on the screen of the vehicle audio/video player 60 as shown in FIG. 4A, and presses an enter or equivalent thereto to run the update file.

In the example of FIG. 4A, the user operates a remote controller 63 to select and execute the update file although other keys such as one on the panel of the vehicle audio/video player 60 can also be used. Then the vehicle audio/video player 60 produces a start command "Play" which is transferred by the interface unit 55 as the start command to the portable audio/video player 51. In response to the start command, the portable audio/video player 51 plays the selected file, in this case the update file, "Alpine Update V3.1". The update file is sent to the interface unit 55 and the update process will be displayed on the vehicle audio/video player 60 as shown in FIG. 4B.

As will be described in more detail later, the interface unit 55 includes a microprocessor, a memory, and other components such as a decoder. The memory such as a flush memory stores the program for conducting an operation for interfacing between the portable audio/video player 51 and the vehicle audio/video player 60. The memory also stores the program for conducting the operation for updating the interface unit 55 of the present invention.

When playing the update file "Alpine Update V3.1" as shown in FIG. 4B, the interface unit 55 decodes the data in the update file and executes the update operation as will be described in detail with reference FIGS. 5-7C. During this update procedure, the user may hear strange sounds from the vehicle audio/video player 60 since the software data for updating the interface unit 55 is in the format same as a music file. The user will not be surprised by the sounds because the user knows that what is being reproduced now is the software data that is musically meaningless.

Figure 5:
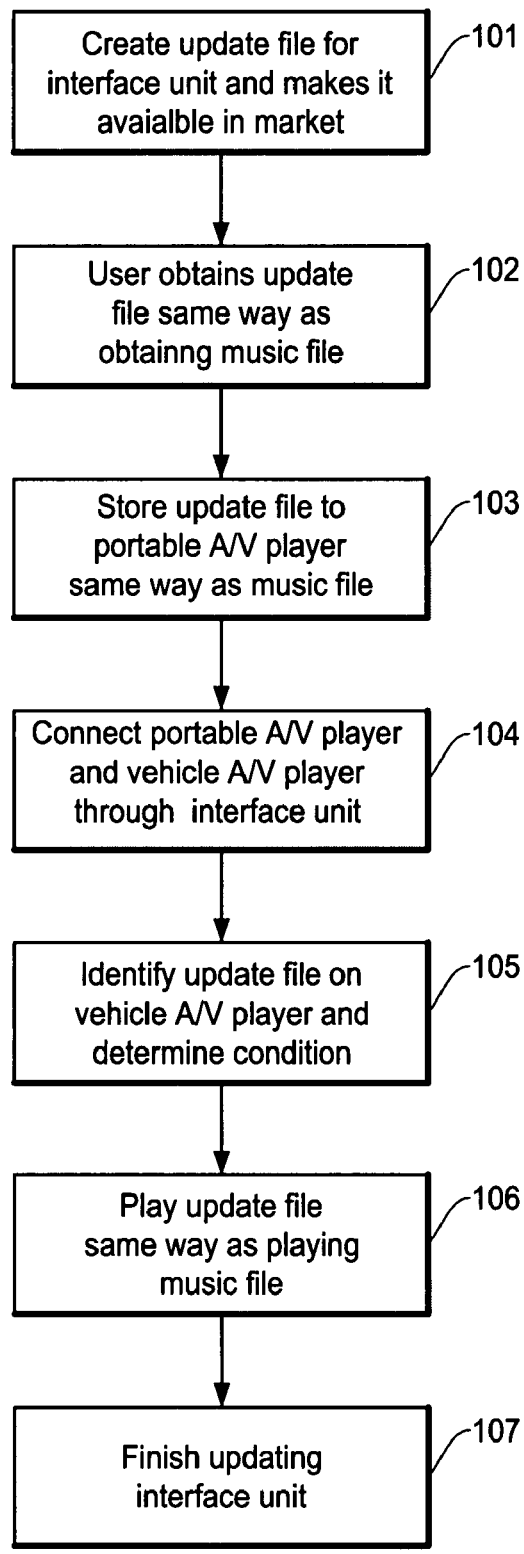
FIG. 5 is a flow chart showing a basic operational flow for updating the software of the interface unit in accordance with the present invention when the portable audio/video player is updated.

FIG. 5 is a flow chart showing the steps of operation of the present invention for updating the software of the interface unit 55 corresponding to the update of the firmware of the portable audio/video player 51. In the first step 101, when the portable audio/video player 51 is updated, which is typically announced by a supplier of the portable audio/video player 51, a supplier of the interface unit 55 develops software data corresponding to such update for the interface unit 55.

The software data is converted to the music file format such as WAV (waveform audio format) so that the update file can be treated in the same manner as the music files. The update file for the interface unit 55 is put into the market through networks, storage devices such as CD (compact disc), e-mail, etc. as shown in FIG. 3 so that the user can easily obtain the update file.

Typically, a supplier of the portable audio/video player 51 and a supplier of the interface unit 55 are different entities. It is preferable that business agreements be established between the supplier of the portable audio/video player 51 and the supplier of the interface unit 55 so that the information concerning the update is exchanged between them quickly and accurately. However, the present invention can be implemented in such a situation where there is no business relationship between a supplier of the portable audio/video player 51 and a supplier of the interface unit 55.

As noted above, in the step 101, the update file is created by converting the software data to the music file format by encoding the software data. An encoding method that can be used for this purpose includes Manchester encoding, that has the advantage of combining clock and data into one stream (FIGS. 10A-10C). The encoding method is not limited to Manchester encoding and other encoding methods can be used as well.

In the step 102, the user of the interface unit 55 retrieves the update file through various ways noted above, such as through a supplier's website, via a storage device such as a compact disc, memory card, or some other media storing the update file, or an e-mail. The update file may also be downloaded via a web feed that allows the content of the update file to be delivered to a subscriber, such as podcasting. Typically, the user processes the update file by means of a readily-available digital media player application (DMPA) which functions to connect to an internet music download service, download music files, manage the contents of the downloaded files.

The internet music download service via DMPA is a popular means to purchase audio files, which is familiar to many users of the portable music players, an example of DMPA includes "iTune" by Apple Computer. When the user retrieves the update file, it is stored in the user's portable audio/video player 51 in the step 103. The user can store the update file through DMPA noted above, in a similar manner that the user stores music files such as MP3 files into the portable audio/video player 51.

Figure 1:
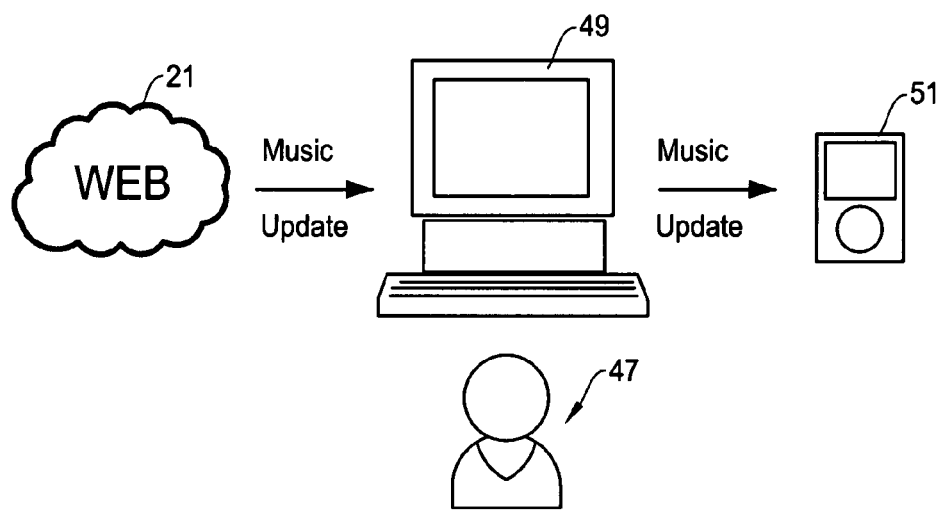
FIG. 1 is a schematic diagram showing the relationship among a user, computer, a portable audio/video player for downloading audio/video files from a remote server and creating a play list in the portable audio/video player in the conventional technology.
Figure 2:
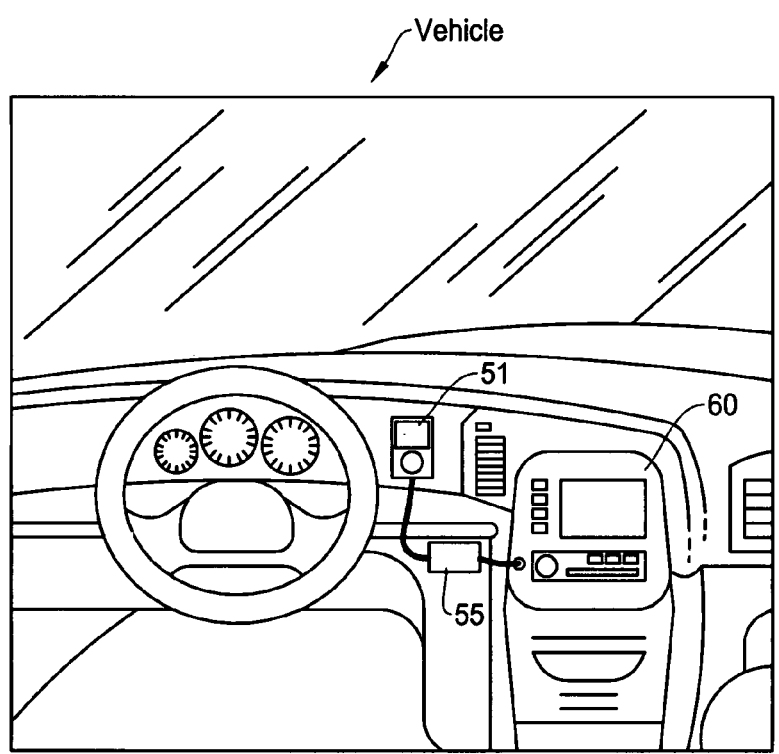
FIG. 2 is a schematic diagram showing an example of vehicle interior view including the connection among a portable audio/video player with a vehicle audio/video player through an interface unit.

Next, in the step 104, the user connects the portable audio-video player 51 to the interface unit 55 that is connected to the vehicle audio/video player 60. As shown in FIG. 2, the user typically connects the portable audio-video player 51, the interface unit 55 and the vehicle audio/video player 60 via predefined cables. However, the connection among such devices can be established by other means, such as wireless transmission of signals using, for example, FM carrier waves, etc.

In the step 105, as the portable audio/video player 51 is connected to the interface unit 55, the user specifies the update file from the play list for updating the interface unit. Such a selection is done on the screen of the vehicle audio/video player 60 as shown in FIG. 4A. In response, the interface unit 55 checks the files stored in the portable audio/video player 51 as to whether the update file is an appropriate one.

For example, in this step, the interface unit 55 will check whether the update version of the update file specified by the user is newer than the currently installed version. The version of the update file may be indicated in the file name of the update file or embedded tag that store meta data information. As noted above, the information on the update file is also displayed on the screens of both the portable and vehicle audio/video players in the manner as the other music files as shown in FIG. 4A.

When the interface unit 55 determines that the update file is to be installed, it will start the update operation either automatically or upon user's start command in the step 106. For example, the user selects the update file on the screen of the vehicle audio/video player 60 and presses the start key to send a start command "Play" to the portable audio/video player 51 as shown in FIG. 4B. Thus, the portable audio/video player 51 sends the update file to the interface unit 55 in the same manner that it sends the music file to the interface unit 55 so that audio sounds will be produced by the vehicle audio/video player 60.

In the interface unit 55, this update procedure starts by decoding the update file which is in the music file format to the digital data format to reproduce the software data for updating the interface unit 55. In the step 107, the update operation will be conducted by writing the update software in the memory of the interface unit, thus, the interface unit 55 finishes the installation of the updated software data within a relatively short period of time such as 40 seconds. The interface unit 55 may instruct the portable audio/video player 51 to delete the update file after the installation is successfully completed.

An example of detailed operational steps for updating the software of the interface unit 55 under the present invention is described with reference to the flow charts of FIG. 6 and FIGS. 7A-7B. In this example, it is assumed that the portable audio/video player 51 is "iPod" marketed by Apple Computer, Inc., and a digital media player application ("DMPA") is "iTune" also by Apple Computer, Inc. Although, specific product names such as "iPod" and "iTune" are used for the explanation, the basic idea is the same as other portable devices and associated application software for implementing the present invention.

Figure 6:
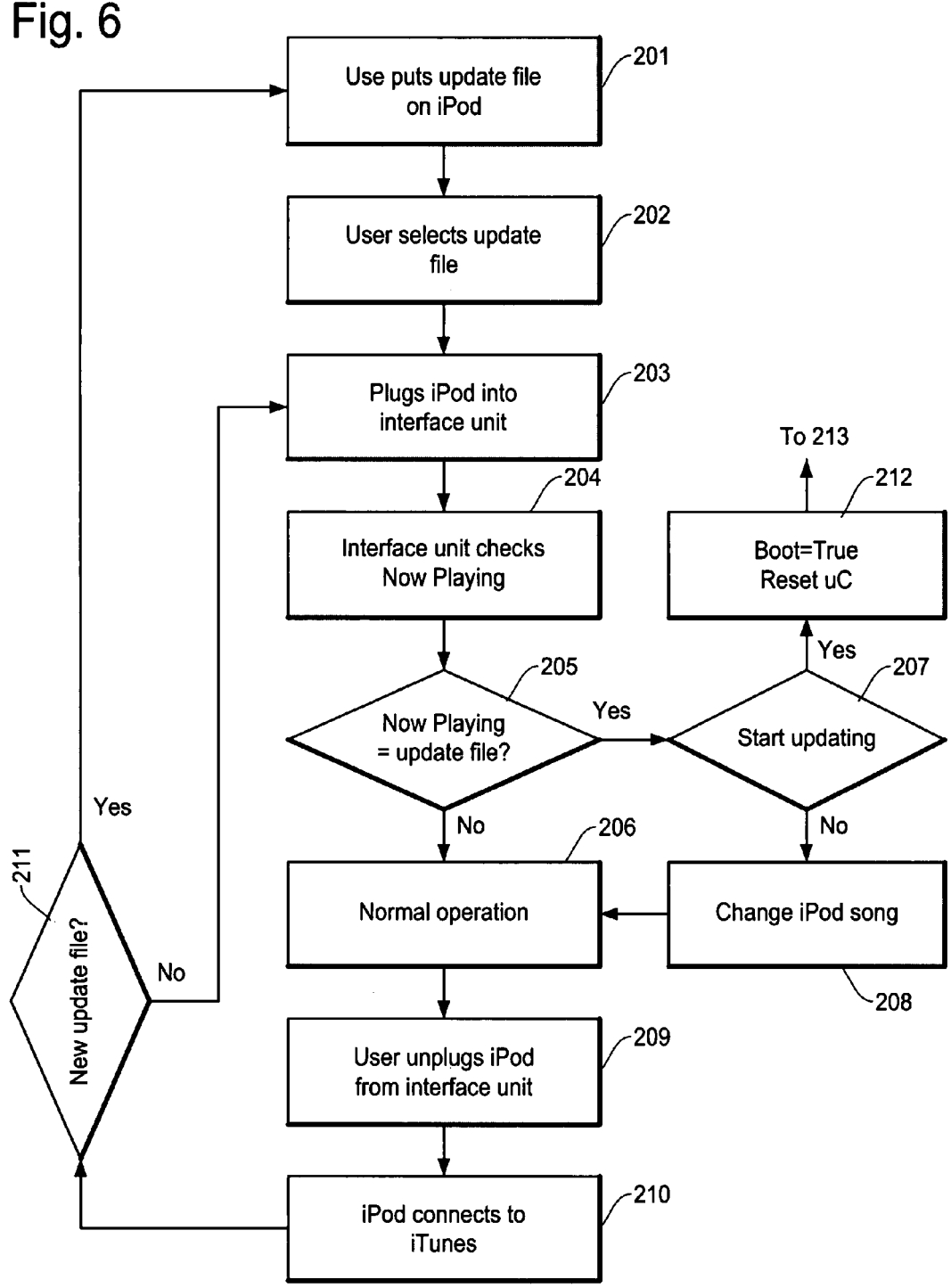
FIG. 6 is a flow chart showing detailed steps of operation for updating the software of the interface unit where the user obtains the update file and stores the update file in the portable audio/video player.
Figure 7A:
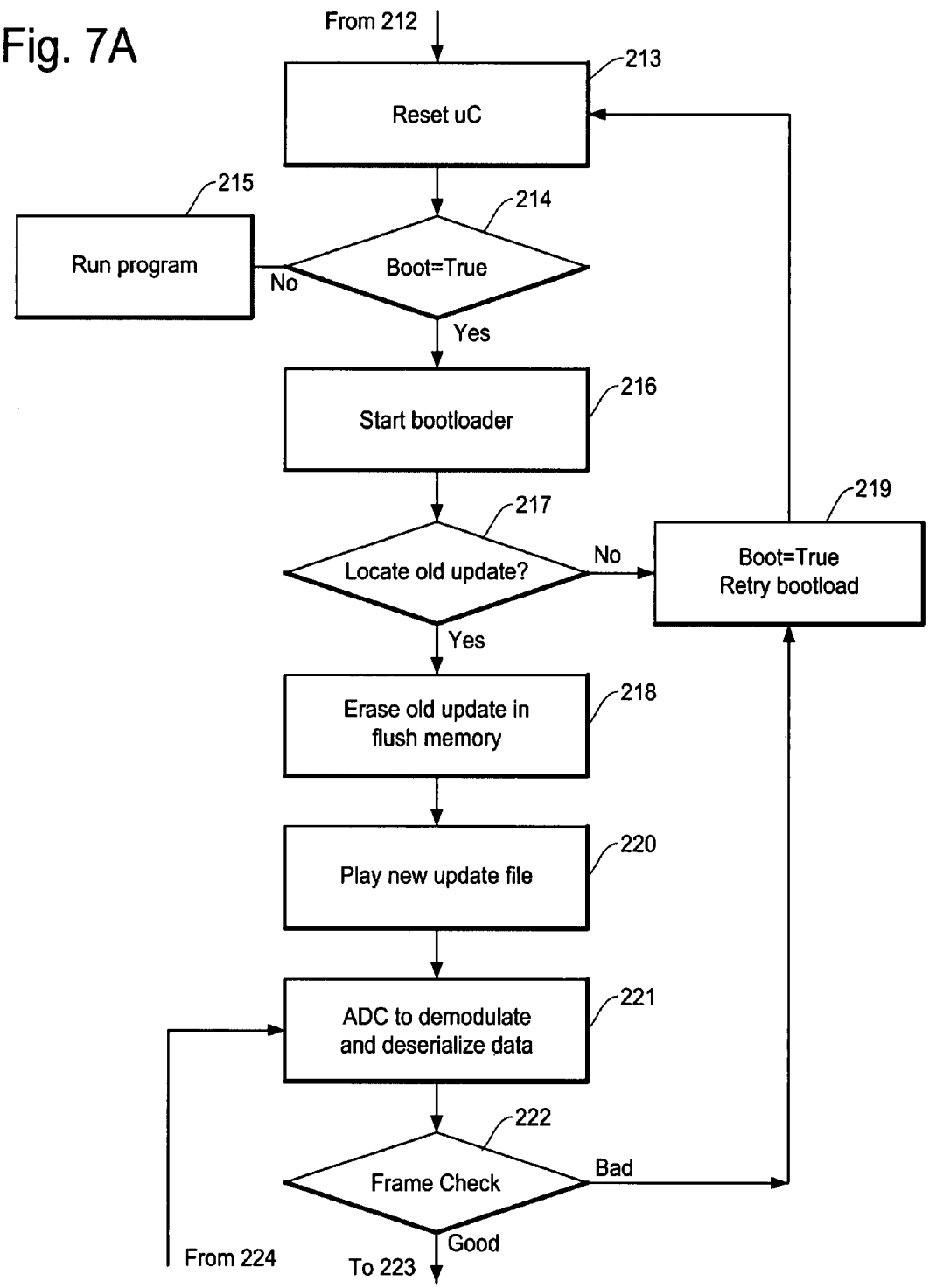
FIGS. 7A and 7B are flow charts showing detailed steps of operation for updating the software of the interface unit that follow the steps of FIG. 6 where the update file is executed and written in a memory of a microprocessor provided in the interface unit under the present invention.
Figure 7B:
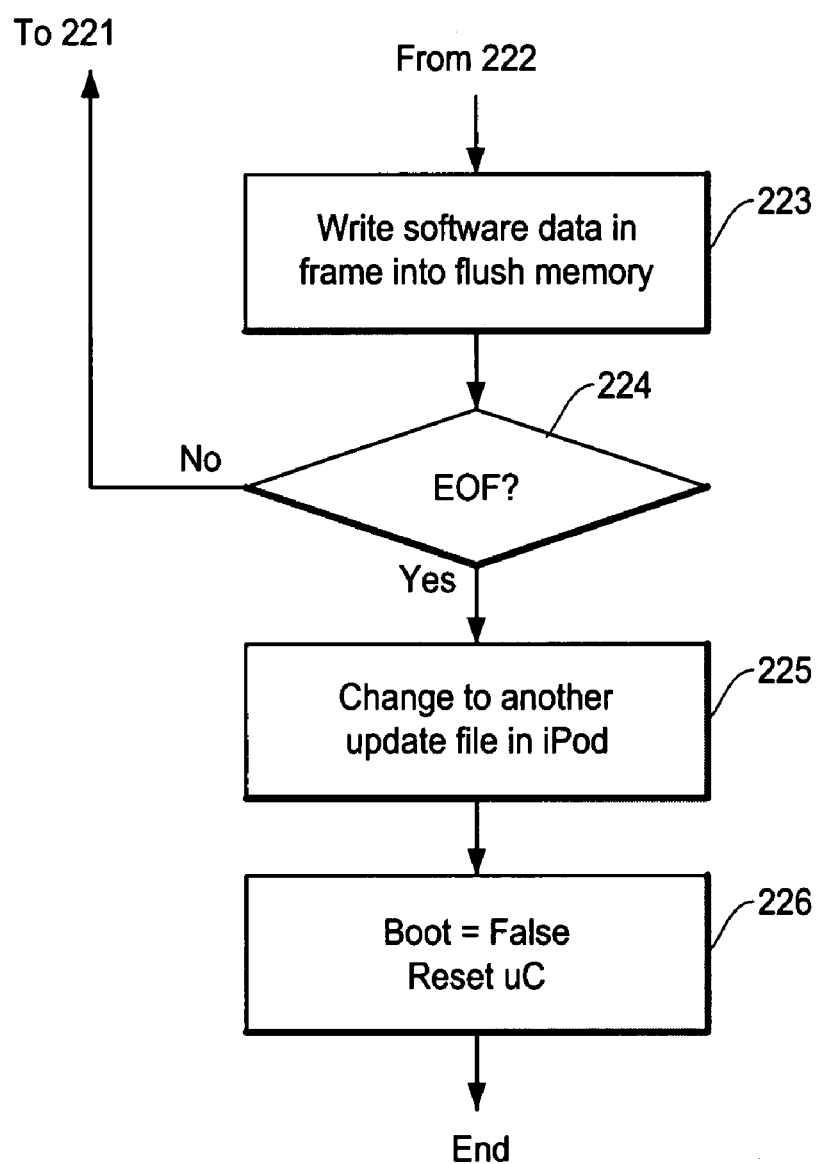

Referring to the flow chart of FIG. 6, the operational steps in the first part of the present invention is described in which the user installs an update file in iPod, selects the update file and starts the update operation. As noted above, such an update file for the interface unit 55 is prepared and made available when the update is made for iPod. In the step 201, the user installs an update file in iPod which is typically done through the internet through a computer which is operated by iTune. This procedure may be performed by automatic transfer between iTune and iPod (internet), or may be performed manually by the user (via storage device).

Then, since the update file is in the music file format, it is treated in the same way as the other music files, i.e., as a part of play list. Thus, when the user wants the update, the user selects the update file from the play list in the step 202. Then, in the step 203, the user plugs iPod to the interface unit 55 as shown in FIG. 2 to electrically connect therebetween. The steps 202 and 203 can be interchanged so that the user can selects the update file while looking at the larger screen of the vehicle audio/video player 60 as shown in FIG. 4A.

As the interface unit 55 detects the connection to iPod, it will check the item of "Now Playing" or a relevant play list of iPod in the step 204. The interface unit 55 will then determine whether the file that is "Now Playing" is an update file in the step 205 or the user incorrectly selects a normal music file, etc. The update file may be identified by the file name or associated meta data such as MP3 tag data.

If the interface unit 55 does not find an update file, i.e., the answer in the step 205 is negative, the procedure will advance to the normal operation in the step 206 for playing music, etc. After using iPod in the vehicle in combination with the vehicle audio/video player 60, the user will eventually disconnect iPod from the interface unit in the step 209. Then, the user will connect iPod to the computer (iTune) in the step 210, which allows the user to transfer new music files to iPod or synchronize the music library to iTune.

In the step 211, while iPod is connected to the computer, iTune or the user will determine whether a new update file is available. If a new update file is available and the user wants it, the user will install the update file in iPod in the step 201 in the manner noted above. Thus, the steps from 201 to 211 will be repeated until an appropriate update file is found before moving to the steps of update operation in the interface unit 55.

In the case where the item that is "Now Playing" in the play list in the step 205 is an update file, i.e., the answer in the step 205 is affirmative, the interface unit 55 checks whether the update file is an appropriate one such as a correct version in the step 207. The version of the update file may be found in the file name or the meta data such as MP3 tag of the update file. Thus, the interface unit 55 will determine whether the version of the update file is newer than the version that has already been installed.

In the case where the version of the update file is not newer than the current installed update or otherwise inappropriate, the interface unit sends a message to iPod to resume the normal operation in the step 206 to change the song (music file) through the step 208. If on the other hand the update file version is determined to be an appropriate one, i.e., the answer is affirmative in the step 207, the process moves to the step 212 wherein the interface unit 55 will start updating the software by activating a booting process to reset a microprocessor ("uC") therein.

The procedure of updating operation after identifying the appropriate update file is described with reference to the flow charts of FIGS. 7A and 7B. Referring to FIG. 7A, when the new version of an update file is found, the interface unit 55 will set a boot flag to true (Boot=True) and reset (restart) the microprocessor ("uC") in the step 213. After the microprocessor restarts (resets) in the step 213, the process checks whether the boot flag is true in the step 214. If it is true, it initiates a boot loader that functions to load and install a program (software data) to the a storage device, such as a flush memory of the microprocessor of the interface unit 55 (step 216). If it is not true, there may be a problem in installing the program for the interface unit. Thus, in the step 215, the interface unit runs the program to bring it to the normal condition.

Although a flush memory is used in this embodiment of the interface unit 55 for storing the updated software data, any other storage medium may be used for this purpose. In the step 217, the interface unit 55 will determine a location of the flush memory at which the old version of the software data is stored. If such a location is found in the flush memory or there has been no update before, the process moves to the step 218 to erase the content of the flush memory or otherwise specify the location to store the new software data in the flush memory. If such a location is not found in the flush memory even though there was the update before, the process moves to the step 219 to repeat the steps 213 to 217 to find an appropriate location in the flush memory to store the software data.

Then, the interface unit 55 will play the update file in the step 220 to install the software data in the update file in the flush memory. The software data in the update file which is in the music file format is converted into a digital format through a decoding process (demodulation) and is deserialized in the step 221. An example of decoding process may be done, for example, by a simple ADC (analog to digital conversion) method as will be described later (FIGS. 11B and 11C).

In the step 222, the frame of the digital data retrieved from the update file is checked to determine whether the data in the frame is in a condition to be written in the flush memory. If the frame is not in the good condition, the process moves to the step 219 to repeat the steps 213 to 222 until an appropriate frame will be detected for conducting the next step 223. In the next step 223 shown in FIG. 7B, if the frame that has been deemed to be in the good condition in the step 222, the software data in that frame is written in the flush memory of the interface unit 55.

Then, the interface unit 55 will check whether the end of file ("EOF") is reached, i.e., the data of all the frames have been stored in the flush memory, in the step 224. If the end of file is not reached, the process returns to the step 221 and repeats the above noted steps to store the software data of all the frames in the flush memory. If it is determined that the end of update file is reached in the step 224, the updating procedure will be terminated so that the user can change the file on the iPod to other update file if any in the step 225.

In this step, the interface unit 55 may instruct the portable audio/video player 51 to erase the update file for which the installation is successfully completed. Finally, the boot flag is set to false (Boot=False) and restarts the microprocessor in the step 226, which ends the overall updating procedure of the present invention. During the period when the updating procedure described above is being performed, the interface 55 may indicate that updating is in progress on the screens of iPod as well as the vehicle audio/video player 60 as shown in FIG. 4B.

Figure 8:
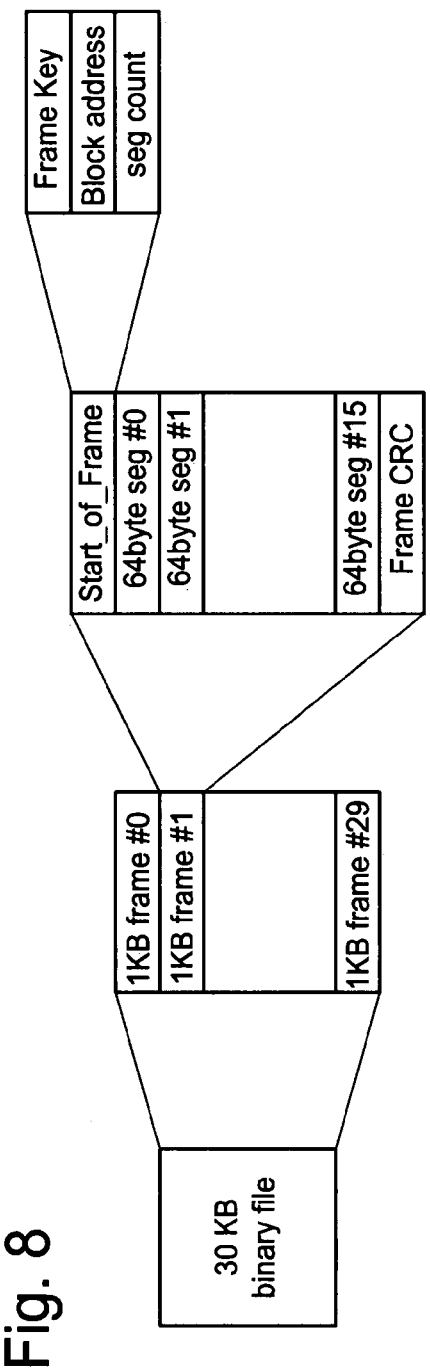
FIG. 8 is a schematic diagram showing an example of layered data structure in the update file for updating the software data of the interface unit in accordance with the present invention.
Figure 9:
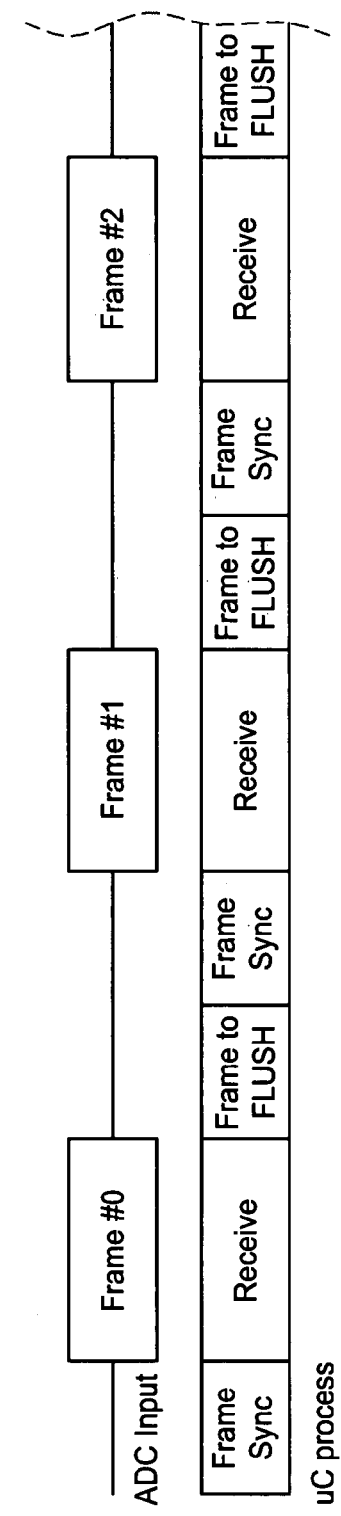
FIG. 9 is a schematic diagram showing an example of timing flow in the operation for updating the software data of the interface unit by writing the software data in a memory in the interface unit in the present invention.

An example of structure and segmentation of data in the update file and transmission timing of the data is described with reference to the schematic diagrams of FIGS. 8 and 9. It should be noted that such a data structure and segmentation is just an example for implementing the present invention and can take various other forms. FIG. 8 shows an example of data structure in the update file which is configured by a multiple layer of frames and segments. FIG. 9 shows the data structure that is serialized from the structure of FIG. 8 and the operation timing for storing the software data in the update file in the interface unit 55.

In the example of FIG. 8, 30 KB (kilobyte) of binary data is divided into 30 frames from 0 to 29, each of which is configured by 1 KB of data. Each frame is further divided into 16 segments from 0 to 15 where the first frame "Start_of_Frame" indicates the start of frame where 16 segments follow, and the last frame "CRC (cyclic redundancy code)" is provided to correct error in the data for each frame. As shown in FIG. 8, each "Start_of_Frame" segment is further divided into a frame key, a block address and a segment count.

In the example of FIG. 9, the data shown in FIG. 8 is serially input to the decoder of the interface unit 55 (FIG. 11A) where the update file is decoded. As will be described later, such a decoder can be a simple ADC (analog to digital converter). The ADC input in FIG. 9 indicates the flow of digital data that is converted to the digital data from the update file of music file format. The uC (microprocessor) process in FIG. 9 indicates the action of the microprocessor in the interface unit 55 to interpret and store the software data in the flush memory.

In the uC process, "Receive" denotes a procedure to transfer the software data to the flush memory, "Frame to FLUSH" denotes a procedure to write the software data into the flush memory, and "Frame Sync" denotes a procedure for error detection/correction. The above procedures will be repeated until the last frame in the update file is processed. The file segmentation and transmission timing in the present invention is not limited to the example described above with reference to FIGS. 8 and 9, and one skilled in the art would readily appreciate that other structure, file segmentation, and transmission timing may be utilized without departing the scope and spirit of the invention.

FIGS. 10A-10C are timing charts showing an example of waveform conversion of the software data for creating the update file in the music file format in the present invention, where FIG. 10A shows HEX representation of the software data for the update, FIG. 10B shows a data waveform corresponding to the software data of FIG. 10A, and FIG. 10C shows waveforms involved in converting the data of FIG. 10B to Manchester encoded data to create the update file in the music file format.

When a supplier of the interface unit 55 obtains the information on the update of the portable audio/video player 51, the supplier develops software data for the interface unit 55 so that the updated function, etc. of the portable audio/video player 51 can be used on the vehicle audio/video player 60. The software data for the update developed by the supplier is illustrated in FIG. 10A which shows an image of HEX (hexadecimal) representation of the software data typically displayed on the computer screen. FIG. 10B shows an image of data waveform corresponding to the software data of FIG. 10A on a time scale. In the present invention, the update file for the interface unit 55 is made available in the market in the same format as the music file that the user can retrieve and store in the personal audio/video player 51.

Thus, as shown in FIG. 10C, the software data of FIG. 10B is converted to the music file format by a Manchester encoding (phase encoding) where the encoded data is shown at the bottom. The Manchester encoded data is a form of data code in which each bit of data is signified at least one voltage level transition. As shown in FIG. 10C, the Manchester coding allows for clock and data to be combined in one stream, i.e., self-clocking, thus, accurate synchronization of a data stream is possible.

Figure 11A:
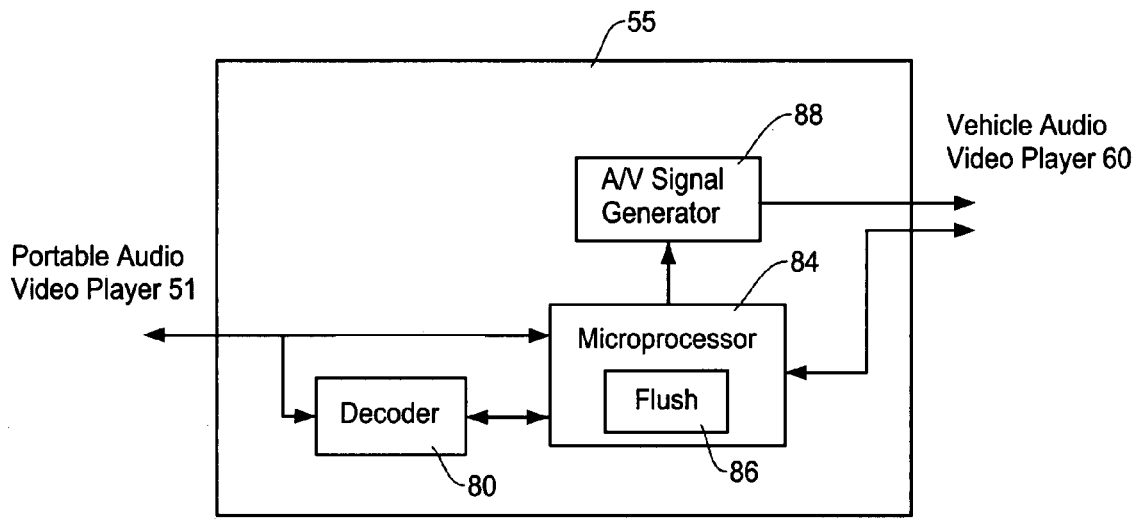
FIGS. 11A-11C are schematic diagrams showing an example of structure of interface unit associated with the present invention, where
Figure 11B:
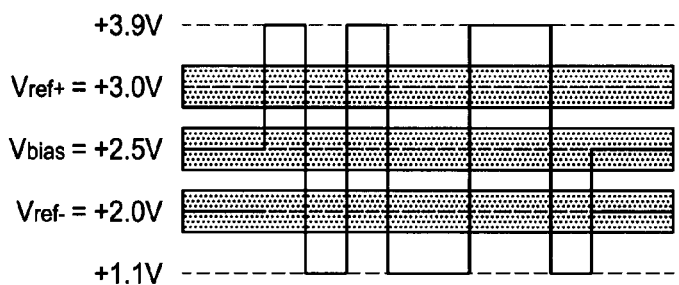
Figure 11C:
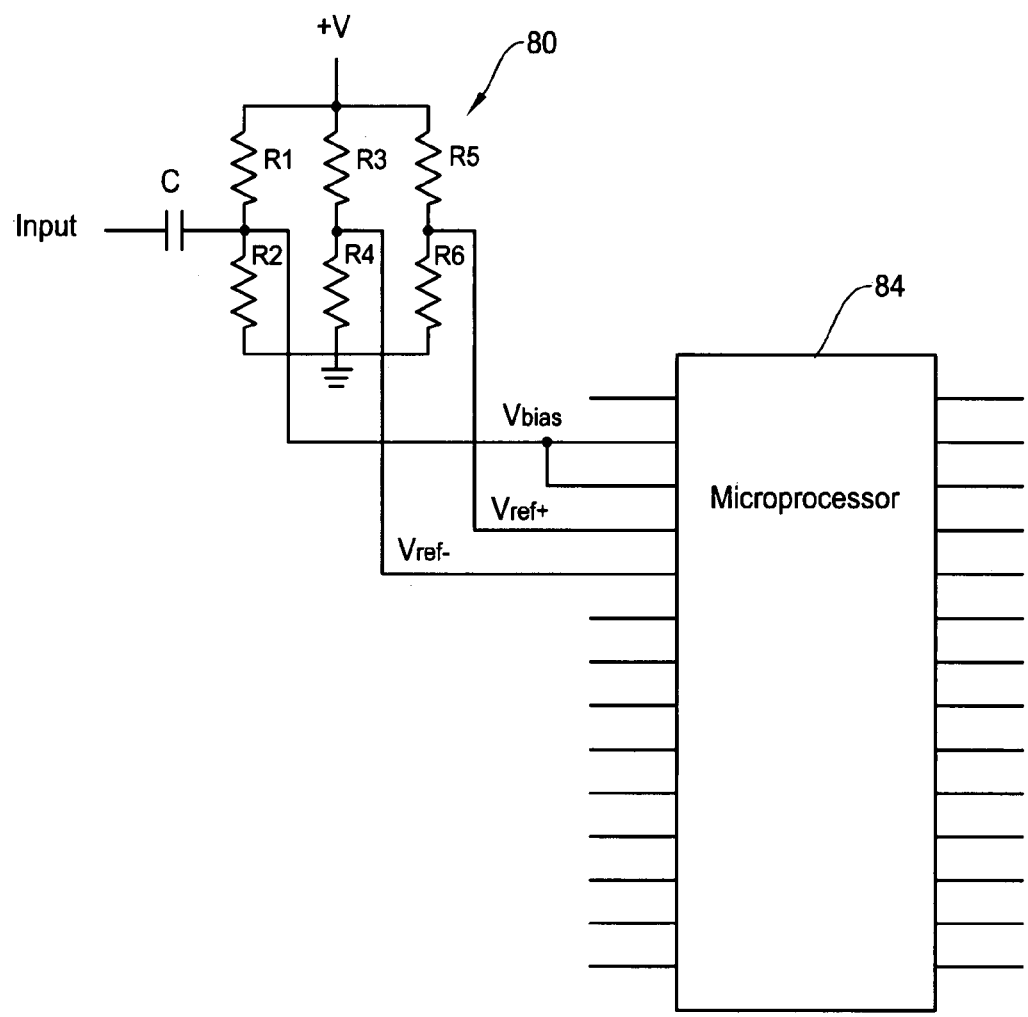

FIGS. 11A-11C are schematic diagrams showing an example of structure and operation of the interface unit 55 associated with the present invention. FIG. 11A is a schematic block diagram showing an example of basic structure of the interface unit 55 of the present invention. In this example, the interface unit 55 includes a decoder 80, a microprocessor (uC) 84 with a flush memory 86, and an audio/video (A/V) signal generator 88.

The decoder 80 decodes the update file to extract the software data for updating the interface unit 55 since the update file from the portable audio/video player 51 is in the format (ex. Manchester coded data) of music file. The flush memory 86 in the microprocessor stores the program for basic operation of interfacing between the portable audio/video player 51 and the vehicle audio/video player 60 as well as the software data for updates. The A/V signal generator 88 generates an audio/video signal that is converted from the music file from the portable audio/video player 51 to be compatible with the vehicle audio/video player 60.

In the normal operation where a music file is to be reproduced by the vehicle audio/video player 60, the music file from the portable audio/video player 51 is directly supplied to the microprocessor 84. The music file is converted to an appropriate format by the A/V signal generator 88 so that the audible sounds (and also images) will be produced by the vehicle audio/video player 60. Thus, the decoder 80 in the interface unit 55 is not used during this operation.

In the operation for updating the interface unit 55, the microprocessor 84, based on the program stored in the flush memory 86, determines whether it is an appropriate update file, and if so, starts the update procedure as described with reference to FIGS. 6 and 7A-7B. The microprocessor 84 receives the update file that is decoded by the decoder 80 and serially processes the decoded data in the manner shown in FIG. 9. Thus, the software data in the update file is stored in the flush memory 86, thereby completing the update procedure.

FIGS. 11B and 11C show an example of the decoder 80 which is an analog to digital converter (ADC) for decoding the update file before being processed by the microprocessor 84. FIG. 11B shows waveforms of the input data to the decoder 80 such as the Manchester coded data (FIG. 10C), high and low reference and bias voltages. Since the Manchester coded data is self-clocking, by providing the appropriate reference and bias voltages $V_{ref+}$, $V_{ref-}$, $V_{bias}$, the software data with the voltage associated with the shaded areas will be obtained in combination with the clock, thereby retrieving the software data in digital format.

FIG. 11C shows an example of structure of ADC as an example of the decoder where the voltage dividers formed by resistors R1-R6 establish the above noted reference and bias voltages. Namely, a positive voltage V is divided by the resistors R1 and R2 to define the bias voltage $V_{bias}$, by the resistor R3 and R4 to define the reference voltage $V_{ref+}$, and by the resistors R5 and R6 to define the reference voltage $V_{ref-}$. Such voltages are supplied to the corresponding inputs of the microprocessor 84 as threshold voltages so that the input data is decoded to be processed by the microprocessor 84 as described in the foregoing.

As has been described above, according to the present invention, when the portable audio/video players are updated by improving the functionalities, adding new features, correcting the problems, etc., the method and apparatus of the present invention enables the users to obtain the corresponding update file for the interface unit in the same manner that the user obtains the music file. Thus, the user can easily and quickly obtain the update file for updating the interface unit and store it in the portable audio/video player in the same manner as the music files. When executing the update operation, the user selects the update file from the play list and starts playing the update file on the portable audio/video player while connecting it to the interface unit.

In other words, the user can treat the update file for the interface unit in the same way as the music file so that when the user starts the update file on the portable audio/video player, the update operation for the interface unit will be executed. Namely, the method and apparatus of the present invention updates the software data for the interface unit by starting the update file to play on the portable audio/video player in the same manner as an ordinary use of the portable audio/video player for downloading and playing the music file. Therefore, the method and apparatus of the present invention enables to update the software data for the interface unit easily and quickly, at any desired time, with low cost.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of updating an interface unit which interfaces between a portable audio/video player and another audio/video player, comprising the following steps of:
creating an update file for updating the interface unit when an operation of the portable audio/video player is updated, said update file being designed to implement the update of the interface unit corresponding to the update of the portable audio/video player;
storing the update file in the portable audio/video player through a process identical to that storing a music file in the portable audio/video player for reproducing audio sounds and/or video images;
connecting the portable audio/video player with the interface unit;
checking if the update file exists in the portable audio/video player;
displaying the update file in a music list which lists music files to be reproduced to determine whether to run the update file on said interface unit;
resetting a microprocessor of the interface unit if the update file exists;
starting a bootloader to update the interface unit; and
running the update file stored in the portable audio/video player so that the update file is transferred to the interface unit;
wherein the update file stored in the portable audio/video player is in a format identical to that of the music file for the portable audio/video player and said another audio/video player acts as a user interface to display said update file and activate said running of said update file on the portable audio/video player, and the step of creating the update file includes a step of converting the software data for the interface unit to a format identical to that of the music file used in the portable audio/video player.

2. A method of updating an interface unit as defined in claim 1, wherein said step of creating the update file for updating the interface unit includes a step of developing software data for the interface unit that realizes, in the another audio/video player, improvements, new function, or correction of problem identical to that achieved by the update of the portable audio/video player.

3. A method of updating an interface unit as defined in claim 1, wherein the update file is decoded to a multiple layer of frames and segments.

4. A method of updating an interface unit as defined in claim 3, wherein said step of creating the update file for the interface unit includes a step of encoding the software data by Manchester encoding method.

5. A method of updating an interface unit as defined in claim 4, wherein said step of running the update file includes a step of decoding the update file by the interface unit to retrieve the software data as a digital signal so that the software data is written in a memory of the interface unit thereby updating the interface unit.

6. A method of updating an interface unit as defined in claim 1, wherein said step of creating the update file for updating the interface unit includes a step of placing the update file in a market so that the update file is available to a user through a method and channel identical to that the user obtains music files for the portable audio/video player.

7. A method of updating an interface unit as defined in claim 1, wherein said step of storing the update file in the portable audio/video player includes a step of connecting the portable audio/video player with a computer and assigning the update file in a play list of the portable audio/video player through an application software installed on the computer.

8. A method of updating an interface unit as defined in claim 1, wherein said step of connecting the portable audio/video player with the interface unit includes a step of further connecting the interface unit to the another audio/video player so that information identical to that shown on the portable audio/video player is also shown on the another audio/video player and an instruction from the another audio/video player can be sent to the portable audio/video player.

9. A method of updating an interface unit as defined in claim 1, wherein said step of connecting the portable audio/video player with the interface unit includes a step of further connecting the interface unit to the another audio/video player so that information identical to that shown on the portable audio/video player is also shown on the another audio/video player, and a step of selecting the update file on a screen of the another audio/video player which is sent to the portable audio/video player.

10. A method of updating an interface unit as defined in claim 1, wherein said another audio/video player is a vehicle audio/video player.

11. An apparatus for updating an interface unit which interfaces between a portable audio/video player and another audio/video player, comprising:
means for creating an update file for updating the interface unit when an operation of the portable audio/video player is updated, said update file being designed to implement the update of the interface unit corresponding to the update of the portable audio/video player;
means for storing the update file in the portable audio/video player through a process identical to that storing a music file in the portable audio/video player for reproducing audio sounds and/or video images;
means for connecting the portable audio/video player with the interface unit;
means for checking if the update file exists in the portable audio/video player;
means for displaying the update file in a music list which lists music files to be reproduced to determine whether to run the update file on said interface unit;
means for resetting a microprocessor of the interface unit if the update file exists;
means for starting a bootloader to update the interface unit; and
means for running the update file stored in the portable audio/video player so that the update file is transferred to the interface unit;
wherein the update file stored in the portable audio/video player is in a format identical to that of the music file for the portable audio/video player and said another audio/video player acts as a user interface to display said update file and activate said running of said update file on the portable audio/video player, and the means for creating the update file includes means for converting the software data for the interface unit to a format identical to that of the music file used in the portable audio/video player.

12. An apparatus for updating an interface unit as defined in claim 11, wherein said means for creating the update file for updating the interface unit includes means for developing software data for the interface unit that realizes, in the another audio/video player, improvements, new function, or correction of problem identical to that achieved by the update of the portable audio/video player.

13. An apparatus for updating an interface unit as defined in claim 11, wherein the update file is decoded to a multiple layer of frames and segments.

14. An apparatus for updating an interface unit as defined in claim 13, wherein said means for creating the update file for the interface unit includes means for encoding the software data by Manchester encoding method.

15. An apparatus for updating an interface unit as defined in claim 14, wherein said means for running the update file includes means for decoding the update file by the interface unit to retrieve the software data as a digital signal so that the software data is written in a memory of the interface unit thereby updating the interface unit.

16. An apparatus for updating an interface unit as defined in claim 11, wherein said means for creating the update file for updating the interface unit includes means for placing the update file in a market so that the update file is available to a user through a method and channel identical to that the user obtains music files for the portable audio/video player.

17. An apparatus for updating an interface unit as defined in claim 11, wherein said means for storing the update file in the portable audio/video player includes means for connecting the portable audio/video player with a computer and assigning the update file in a play list of the portable audio/video player through an application software installed on the computer.

18. An apparatus for updating an interface unit as defined in claim 11, wherein said means for connecting the portable audio/video player with the interface unit includes means for further connecting the interface unit to the another audio/video player so that information identical to that shown on the portable audio/video player is also shown on the another audio/video player and an instruction from the another audio/video player can be sent to the portable audio/video player.

19. An apparatus for updating an interface unit as defined in claim 11, wherein said means for connecting the portable audio/video player with the interface unit includes means for further connecting the interface unit to the another audio/video player so that information identical to that shown on the portable audio/video player is also shown on the another audio/video player, and means for selecting the update file on a screen of the another audio/video player which is sent to the portable audio/video player.

20. An apparatus for updating an interface unit as defined in claim 11, wherein said another audio/video player is a vehicle audio/video player.

* * * * *